US 8,279,777 B2

(12) United States Patent
Stewart

(10) Patent No.: US 8,279,777 B2
(45) Date of Patent: Oct. 2, 2012

(54) METHOD FOR SECURE RELIABLE POINT TO MULTI-POINT BI-DIRECTIONAL COMMUNICATIONS

(76) Inventor: Ian A. Stewart, Ventura, CA (US)

(*) Notice: Subject to any disclaimer, the term of this patent is extended or adjusted under 35 U.S.C. 154(b) by 0 days.

(21) Appl. No.: 12/714,754

(22) Filed: Mar. 1, 2010

(65) Prior Publication Data
US 2010/0195650 A1 Aug. 5, 2010

Related U.S. Application Data

(63) Continuation of application No. 11/458,201, filed on Jul. 18, 2006, now Pat. No. 7,672,306.

(60) Provisional application No. 60/700,441, filed on Jul. 18, 2005.

(51) Int. Cl.
*H04L 12/28* (2006.01)
*H04J 3/26* (2006.01)
(52) U.S. Cl. ............... 370/256; 370/390; 370/432
(58) Field of Classification Search ............... None
See application file for complete search history.

(56) References Cited

U.S. PATENT DOCUMENTS

| 5,355,371 | A  | * | 10/1994 | Auerbach et al. ............... 370/255 |
|-----------|----|---|---------|-----------------------------------------|
| 6,353,596 | B1 | * | 3/2002  | Grossglauser et al. ......... 370/256   |
| 6,580,722 | B1 | * | 6/2003  | Perlman ........................... 370/432 |
| 7,016,351 | B1 | * | 3/2006  | Farinacci et al. ............... 370/392 |
| 7,570,605 | B1 | * | 8/2009  | Aggarwal et al. ............... 370/256  |
| 7,602,738 | B2 | * | 10/2009 | Preguica ......................... 370/256 |
| 7,756,072 | B1 | * | 7/2010  | Fenner et al. ................... 370/326 |
| 7,765,300 | B2 | * | 7/2010  | Meehan et al. .................. 709/226  |
| 2004/0010616 | A1 | * | 1/2004  | McCanne ....................... 709/238   |
| 2006/0268749 | A1 | * | 11/2006 | Rahman et al. ................. 370/256   |
| 2007/0025277 | A1 | * | 2/2007  | Sajassi et al. ................... 370/256 |
| 2007/0104194 | A1 | * | 5/2007  | Wijnands et al. ............... 370/390   |
| 2009/0036152 | A1 | * | 2/2009  | Janneteau et al. .............. 455/503   |
| 2009/0292917 | A1 | * | 11/2009 | Lebovitz et al. ................ 713/160   |
| 2010/0220723 | A1 | * | 9/2010  | Jalan et al. ..................... 370/390 |

* cited by examiner

*Primary Examiner* — Timothy J Weidner
(74) *Attorney, Agent, or Firm* — Lowe Graham Jones PLLC

(57) ABSTRACT

Systems and methods for sending secure reliable point to multi-point communication on any communication infrastructure. The infrastructure is not required to conform to any specifications other than to be capable of point to point communications. The system consists of a protocol that allows for Secure Reliable point to multi-point communications irregardless of the support for such communications. This invention does not rely on the Internet or ATM or any other point to point or point to multi-point communications infrastructure.

7 Claims, 6 Drawing Sheets

```
Packet structure for SRM-P2MP

= = = = = = = = = = = = = = = = = = = = = = = = = = = = = = = = =
DATA PACKET Message TYP = 0x01 (binary 01)

ACCESS_SYNCH_CODE  8
PACKET_TYPE        2
CMD                2
RESERVED           4
PACKET SIZE        16
PACKET_NUMBER      16
PACKET FORMAT      2
DECRYPT_Y_N        1
QUIET              4
RESERVED           1
[...PAYLOAD]
```

(6 bits 64 types)

FIG. 4A.

```
MESSAGES    Message TYP = 0x02 (binary 10)

ACCESS_SYNCH_CODE 8
PACKET_TYPE       2
CMD               6
PACKET_SIZE      16
[...PAYLOAD]
```

ADDR_RANGE CHANGE  CMD = 01  (binary 000001)  ←─50

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    | Access Synch  | TYP  CMD     |        Packet Size             |
    +-+-+-+-+-+-+-+-+-+-+-+-+-+-+-+-+-+-+-+-+-+-+-+-+-+-+-+-+-+-+-+-+
    |                         Address [1]                           |
    +-                                                             -+
    |                         Address [2]                           |
    +-+-+-+-+-+-+-+-+-+-+-+-+-+-+-+-+-+-+-+-+-+-+-+-+-+-+-+-+-+-+-+-+
```
←─54

USAGE_REPORT_JOIN CMD = 0x0002 (binary 000010)   ←─60

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    | Access Synch  | TYP   CMD RESRV|      Packet Size             |
    +-+-+-+-+-+-+-+-+-+-+-+-+-+-+-+-+-+-+-+-+-+-+-+-+-+-+-+-+-+-+-+-+
    |                         Address [1]                           |
    +-                                                             -+
    |                         Address [2]                           |
    +-+-+-+-+-+-+-+-+-+-+-+-+-+-+-+-+-+-+-+-+-+-+-+-+-+-+-+-+-+-+-+-+
```
←─64

USAGE_REPORT_LEAVE CMD = 0x0003 (binary 000011)   ←─70

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    | Access Synch  | TYP   CMD RESRV|      Packet Size             |
    +-+-+-+-+-+-+-+-+-+-+-+-+-+-+-+-+-+-+-+-+-+-+-+-+-+-+-+-+-+-+-+-+
    |                         Address [1]                           |
    +-                                                             -+
    |                         Address [2]                           |
    +-+-+-+-+-+-+-+-+-+-+-+-+-+-+-+-+-+-+-+-+-+-+-+-+-+-+-+-+-+-+-+-+
```

ERROR_REPORT CMD = 0x000B (binary 001011)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Access Synch    | TYP  CMD RESRV|        Packet Size           |
+-+-+-+-+-+-+-+-+-+-+-+-+-+-+-+-+-+-+-+-+-+-+-+-+-+-+-+-+-+-+-+-+
|                      Reporting Address [1]                     |
+-                                                              -+
|                      Concerning   Address [2]                  |
+-+-+-+-+-+-+-+-+-+-+-+-+-+-+-+-+-+-+-+-+-+-+-+-+-+-+-+-+-+-+-+-+
|                         Message Data [1]                       |
+-                                                              -+
|                         Message Data [2]                       |
+-                                                              -+
|                         Message Data [3]                       |
+-+-+-+-+-+-+-+-+-+-+-+-+-+-+-+-+-+-+-+-+-+-+-+-+-+-+-+-+-+-+-+-+
```

90

PROBLEM_REPORT CMD = 0x0010 Binary (010000)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Access Synch    | TYP  CMD RESRV|        Packet Size           |
+-+-+-+-+-+-+-+-+-+-+-+-+-+-+-+-+-+-+-+-+-+-+-+-+-+-+-+-+-+-+-+-+
|                      Reporting Address [1]                     |
+-                                                              -+
|                      Concerning   Address [2]                  |
+-+-+-+-+-+-+-+-+-+-+-+-+-+-+-+-+-+-+-+-+-+-+-+-+-+-+-+-+-+-+-+-+
|                         Message Data [1]                       |
+-                                                              -+
|                         Message Data [2]                       |
+-                                                              -+
|                         Message Data [3]                       |
+-+-+-+-+-+-+-+-+-+-+-+-+-+-+-+-+-+-+-+-+-+-+-+-+-+-+-+-+-+-+-+-+
```

US 8,279,777 B2

METHOD FOR SECURE RELIABLE POINT TO MULTI-POINT BI-DIRECTIONAL COMMUNICATIONS

PRIORITY CLAIM

This application is a continuation of U.S. application Ser. No. 11/458,201 filed on Jul. 18, 2006, which claims priority to provisional application Ser. No. 60/700,441 filed on Jul. 18, 2005 which are incorporated herein by reference.

BACKGROUND OF THE INVENTION

The current infrastructure for Point to Multi-Point Communications on such as ATM and IP commonly have drawbacks that this invention addresses. When one sends a IP or UPD packet the arrival of the packet at the destination is not guaranteed. This has become known as "fire it and forget it" transmission. The problem is that many types of communication protocols are also "fire and forget it" type of transmissions. Reliability is accomplished by best effort, and security is not addressed by the protocol at all. The solution is to create a new protocol (set of rules) that uses the existing infrastructure to create a secure, reliable, and scalable "one to many" transmission solution. While there may be many schemes to provide reliability and security to the Internet, these types of new protocols fail to be inter-operable.

Presently communications are a mixture of point to point and point to multi-point infrastructure. In a virtual sense communication protocols have supported both using sophisticated algorithms to form bridges and trees where necessary. These methods are not uniform and make it almost impossible to take advantage of point to multi-point infrastructure where it is available. This is because bridging from open point to multi-point using closed point to point must encapsulate the point to multi-point data resurfacing the data where point-to multi-point communications can have advantage.

FIG. 1 shows a system that encapsulates messages in order to create an embedded list of destinations for multipoint transmission. This system is used for Small Group Multicasting because this list can only accommodate a finite number of addresses.

SUMMARY OF THE INVENTION

The present invention creates a tree structure to enable the efficient handling of bi-directional point-to-multipoint communications. Applicant submits that the protocol being protocol independent having bidirectional information.

The present invention creates a model for communications that can accomplish secure reliable point to multi-point communications irregardless of the underlying infrastructure.

BRIEF DESCRIPTION OF THE DRAWINGS

Preferred and alternative embodiments of the present invention are described in detail below with reference to the following drawings:

FIGS. 4A and B show specific examples of commands using the protocol shown in FIG. 3.

DETAILED DESCRIPTION OF THE INVENTION

Terminology:

Secure Reliable Point to Multi-Point communications (SRM-P2MP)

A sender of information to multi-point receivers is a sender node (SN).

A receiver of multi-point communication is called a multiple end node (MEN).

A repeater of data is called a multiple repeat node (MRN).

Figure 1:
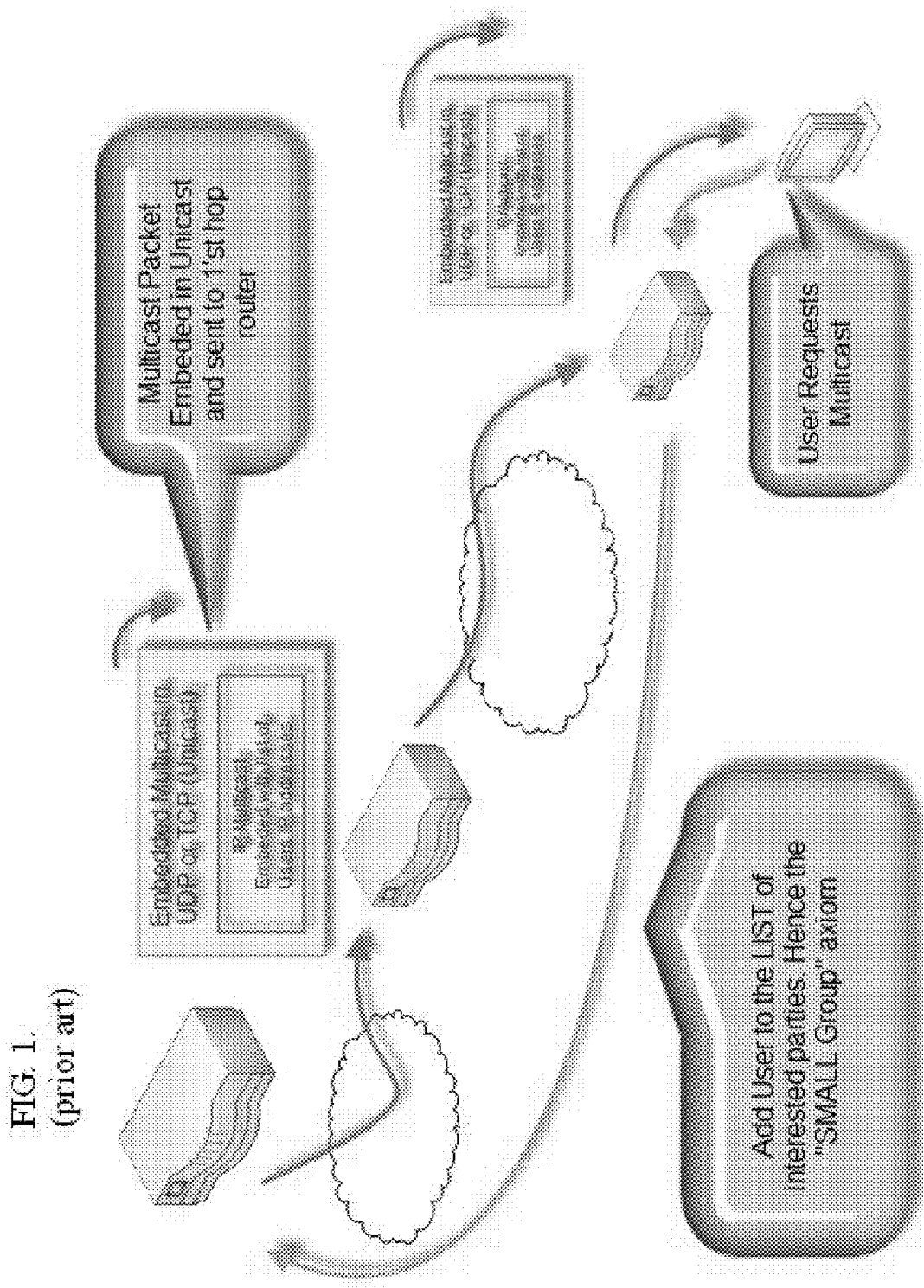
FIG. 1 illustrates a system formed in accordance with the prior art.
Figure 2:
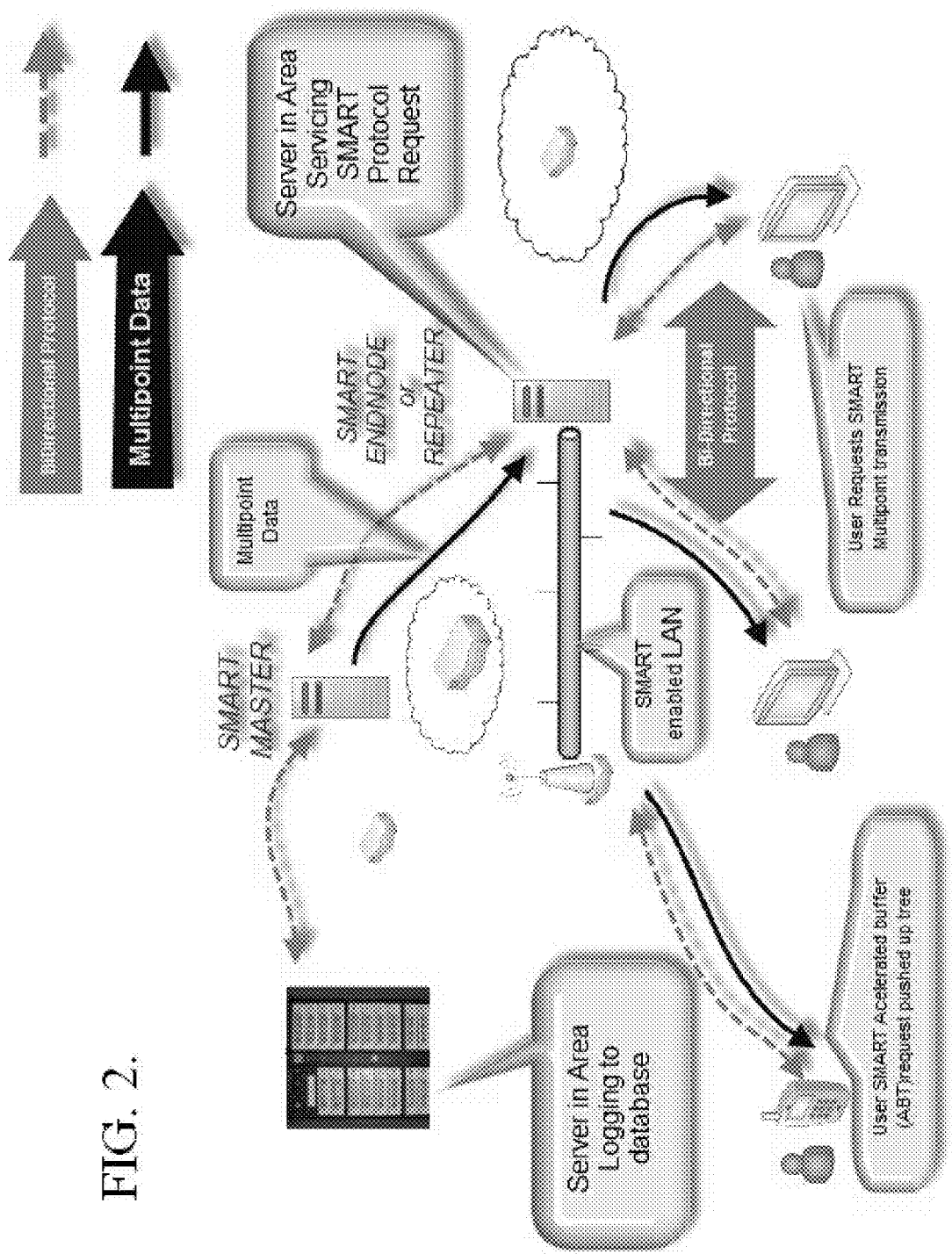
FIG. 2 illustrates a system formed in accordance with an embodiment of the present invention.

FIG. 2 shows an example system formed in accordance with an embodiment of the present invention. The system creates a tree structure that enables the efficient handling of bi-directional point-to-multipoint communications. Applicant submits that the protocol is protocol independent having bidirectional information.

Figure 3:
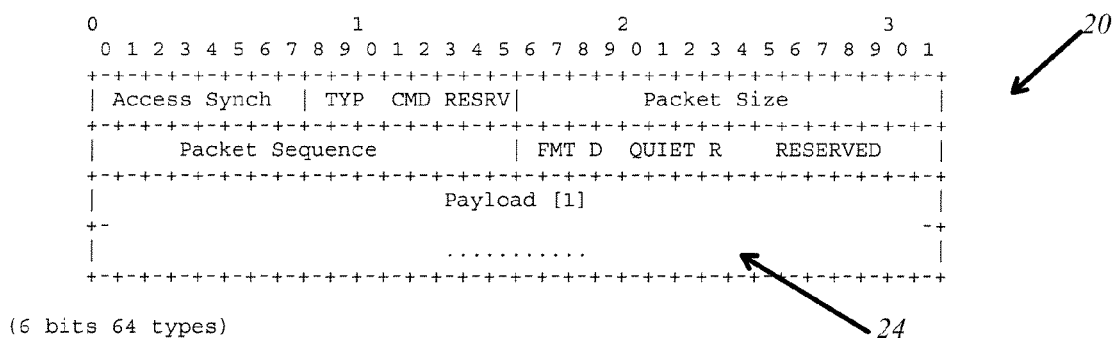
FIG. 3 shows a structure for a protocol formed in accordance with an embodiment of the present invention.

FIG. 3 shows a technical description of the protocol using a bit map to show an encapsulated packet 20. The encapsulated packet 20 includes a payload 24. The payload 24 includes a multicast broadcast and other bidirectional information, such as that shown in FIGS. 4A, B. FIGS. 4A, B. The encapsulated packet 20 includes an access synchronization code info (ACCESS_SYNCH_CODE), packet type data (PACKET_TYPE), command info (CMD), packet size info (PACKET SIZE), packet number info (PACKET_NUMBER), packet format info (PACKET FORMAT), decryption info (DECRYPT_Y_N), go into quiet mode info (QUIET), and the actual payload.

As shown in FIG. 4A, a message address range change command (CMD) 50 includes address [1] and [2] information in a payload 54. A usage report of a multicast join (USAGE_REPORT_JOIN) CMD 60 includes a multicast source address (Address [1]) and an end user's IP address (Address [2]) in a payload 64. A usage report of an end user leaving a multicast broadcast (USAGE_REPORT_LEAVE) CMD 70 also includes the same address information as the (USAGE_REPORT_JOIN) CMD 60.

FIG. 4B shows an error reporting message (ERROR_REPORT) CMD 80 and a problem reporting message (PROBLEM_REPORT) CMD 90. They both include the end user's IP address (Reporting Address [1] and the address of the multicast broadcaster (Concerning Address [2]).

Figure 5:
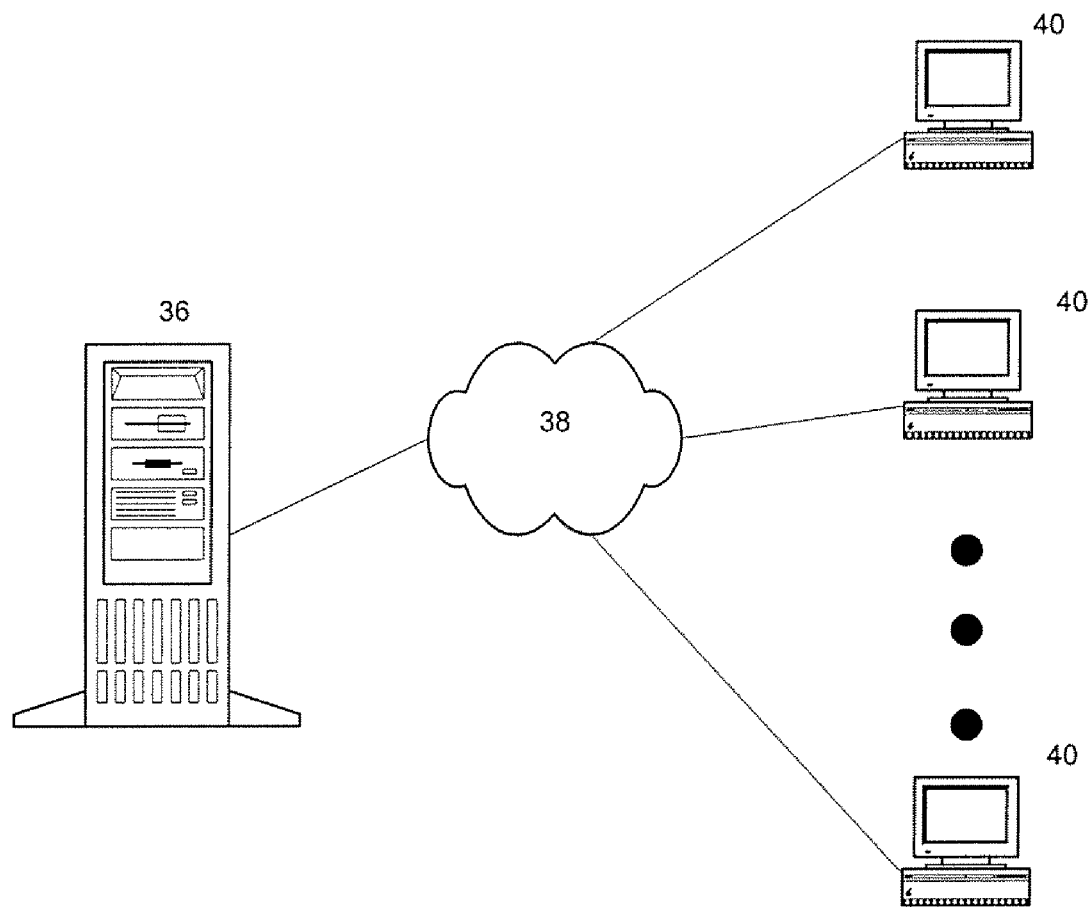
FIG. 5 shows an example network system that uses the protocols shown in FIGS. 4A and B.

Messages and multicast broadcast formatted according to the protocol shown in FIGS. 3, 4A and B are sent over a network 38 between a multicast broadcast system 36 or similar system and end user systems 40, see FIG. 5.

The above protocol is protocol independent. In other words this protocol is not dependent on any other underlying protocol and only assumes some type of communications infrastructure to be present. This could be but is not limited to IP or ATM type connections.

A method for sending secure reliable point to multi-point transmissions. The method establishes an overlaying protocol which is interpreted at each end of the potential links and sends secure data to multiple receivers. The secure date includes but is not limited to audio, video, web pages, electronic files, inventories, status of electronic components, and battlefield information, insures the reliability of said transmissions; and exists between a sender node (SN) and multiple end nodes (MEN).

The protocol executing on an end node detects the core abilities of point to multi-point communication networks and incorporates those core abilities where possible.

The SN encapsulates messages to the MEN which include but are not limited to encapsulated DATA_PACKETS and MESSAGES.

A system sends secure reliable transmissions. The system includes a device coupled to a communications network and configured to encapsulate messages so as to take advantage of the infrastructure and ensure secure reliable transmissions from point to multi-point. The communication system includes an interface locally coupled to a network of communications systems.

The messages are encapsulated on both point to point links and point to multi-point links, thus enabling secure reliable point-to multi-point transmission regardless of the communications network.

The multi-point links can function in a tree-like structure, thus contributing to efficiency. The present invention creates a protocol that runs on top of the protocols comprising the current infrastructure. By establishing a point to multi-point protocol that is platform independent, the capsules that contain the point to multi-point data become homogenized. In one embodiment, the present invention includes a distributed structure that follows the same tree as the IP Multicast. This tree structure allows for (but not be limited to) distributed packet replacement or distributed accelerated buffering. By having the bi-directional protocol function in a tree-like structure, as does Multipoint (or Multicast) the protocol requests can be satisfied by the nearest point where the protocol is understood.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the Claims that follow.

The embodiments of the invention in which an exclusive property or privilege is claimed are defined as follows:

1. A method for sending secure reliable point to multi-point transmissions, the method comprising:
    establishing an overlaying protocol being interpretable at each end of potential links of a point to multi-point transmission; and
    sending feedback data from one of a plurality of multiple end nodes (MEN) being one end of the point to multi-point transmission to a sender node (SN) being another end of the point to multi-point transmission,
    wherein the feedback data is sent in accordance with the established overlaying protocol,
    whereby the feedback data provides the SN with information for improving reliability,
    wherein the SN encapsulates messages to the MEN which include encapsulated data packets and messages based on the protocol,
    wherein the data packets include access synchronization code information, packet type data, command information, packet size information, packet number information, packet format information, decryption information, go into quiet mode information and payload.

2. The method of claim 1, wherein the feedback data provides information relating to at least one of joining a multicast broadcast, leaving a multicast broadcast, errors or problems.

3. A system for sending secure reliable transmissions between each end of a point to multi-point transmission, the system comprising:
    one of a plurality of multiple end node (MEN) devices coupled to a communications network, the MEN device configured to encapsulate one or more messages based on an established protocol; and
    a sender node (SN) device coupled to the communications network, the SN device configured to output a multicast broadcast and receive the encapsulated one or more messages from the MEN devices based on the established protocol, the encapsulated one or more messages being sent using at least one of an IP network or ATM network connection, whereby the information in the one or more messages allows the SN device to determine reliability of transmission,
    wherein the SN device encapsulates messages to the MEN devices which include encapsulated data packets and messages based on the protocol,
    wherein the data packets include access synchronization code information, packet type data, command information, packet size information, packet number information, packet format information, decryption information, go into quiet mode information and payload.

4. The system of claim 3, wherein the one or more messages provide information relating to at least one of joining a multicast broadcast, leaving a multicast broadcast, errors or problems related to multicast broadcast.

5. The system of claim 3, wherein the one or more messages are encapsulated on point to point links.

6. The system of claim 3, wherein the one or more messages are encapsulated on point to multi-point links.

7. The system of claim 6, wherein the multi-point links function in a tree-like structure.

* * * * *